(12) United States Patent
Niu et al.

(10) Patent No.: US 10,166,804 B2
(45) Date of Patent: Jan. 1, 2019

(54) PRINTABLE RECORDING MEDIA

(71) Applicant: Hewlett-Packard Development Company, L.P., Houston, TX (US)

(72) Inventors: Bor-Jiunn Niu, San Diego, CA (US); Oheya M. Alfekri, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 15/306,993

(22) PCT Filed: Jun. 16, 2014

(86) PCT No.: PCT/US2014/042483
§ 371 (c)(1),
(2) Date: Oct. 26, 2016

(87) PCT Pub. No.: WO2015/195073
PCT Pub. Date: Dec. 23, 2015

(65) Prior Publication Data
US 2017/0072726 A1 Mar. 16, 2017

(51) Int. Cl.
*B41M 5/50* (2006.01)
*B41M 5/52* (2006.01)
(Continued)

(52) U.S. Cl.
CPC ............... *B41M 5/52* (2013.01); *B32B 5/024* (2013.01); *B32B 5/028* (2013.01); *B32B 27/08* (2013.01);
(Continued)

(58) Field of Classification Search
CPC .... B41M 5/50; B41M 5/5254; B41M 5/5263; B32B 5/024; B32B 5/028; B32B 27/30; B32B 27/306; B32B 27/308; B41J 2/057
See application file for complete search history.

(56) References Cited

U.S. PATENT DOCUMENTS

| 4,810,581 A | 3/1989 | Akazawa et al. |
| 5,962,544 A * | 10/1999 | Waller, Jr. .................. C08J 9/26 428/315.5 |

(Continued)

FOREIGN PATENT DOCUMENTS

| EP | 1252013 | 8/2001 |
| JP | H0216163 | 1/1990 |

(Continued)

OTHER PUBLICATIONS

International Search Report and Written Opinion for International Application No. PCT/US2014/042483 dated Feb. 27, 2015, 9 pages.

*Primary Examiner* — Betelhem Shewareged
(74) *Attorney, Agent, or Firm* — HP Inc. Patent Department

(57) ABSTRACT

A printable recording media containing a substrate and a coating layer including a mixture of a first polymer selected from the group consisting of a polymer comprising ethylene residues and vinyl alcohol residues and a polymer comprising vinyl alcohol residues and a second polymer comprising ethylene residues, ethyl acrylate or acrylic ester residues and maleic anhydride residues wherein the amount of first polymer, in the mixture, is about 50% to about 95% by weight. Also disclosed herein is a method for making such printable recording media.

21 Claims, 2 Drawing Sheets

(51) Int. Cl.
  *B32B 27/30* (2006.01)
  *B41J 2/005* (2006.01)
  *B32B 5/02* (2006.01)
  *B32B 27/08* (2006.01)
  *B32B 27/12* (2006.01)
  *B32B 27/32* (2006.01)
  *B32B 27/42* (2006.01)

(52) U.S. Cl.
  CPC .............. *B32B 27/12* (2013.01); *B32B 27/30* (2013.01); *B32B 27/306* (2013.01); *B32B 27/308* (2013.01); *B32B 27/32* (2013.01); *B32B 27/42* (2013.01); *B41J 2/0057* (2013.01); *B41M 5/50* (2013.01); *B41M 5/504* (2013.01); *B41M 5/506* (2013.01); *B41M 5/508* (2013.01); *B41M 5/5254* (2013.01); *B41M 5/5263* (2013.01); *B32B 2250/24* (2013.01); *B32B 2262/0253* (2013.01); *B32B 2270/00* (2013.01); *B32B 2307/726* (2013.01); *B32B 2307/75* (2013.01); *B41M 5/5245* (2013.01); *B41M 2205/34* (2013.01); *B41M 2205/36* (2013.01); *B41M 2205/38* (2013.01)

(56) References Cited

U.S. PATENT DOCUMENTS

| | | | |
|---|---|---|---|
| 5,993,977 A | 11/1999 | Laiho et al. | |
| 6,623,841 B1 | 9/2003 | Venkatasanthanam et al. | |
| 7,138,452 B2 | 11/2006 | Kim et al. | |
| 7,494,713 B2 | 2/2009 | Song et al. | |
| 7,632,562 B2 | 12/2009 | Nair et al. | |
| 2002/0037395 A1 | 3/2002 | Zhong et al. | |
| 2002/0099134 A1* | 7/2002 | Bertin | B32B 27/30 525/57 |
| 2003/0064201 A1 | 4/2003 | Xing et al. | |
| 2004/0166294 A1* | 8/2004 | Dalvey | B41M 5/40 428/195.1 |
| 2006/0177597 A1* | 8/2006 | Ebisawa | B41M 5/0017 427/558 |
| 2007/0275190 A1 | 11/2007 | Chen et al. | |
| 2011/0126497 A1 | 6/2011 | Bauer et al. | |
| 2012/0120149 A1 | 5/2012 | Hladik et al. | |
| 2012/0283364 A1 | 11/2012 | Sarazin et al. | |
| 2013/0236660 A1 | 9/2013 | Niu et al. | |
| 2015/0037519 A1* | 2/2015 | Niu | B41M 5/52 428/32.28 |

FOREIGN PATENT DOCUMENTS

| | | |
|---|---|---|
| WO | WO 0162510 | 8/2001 |
| WO | WO-2004-052655 | 6/2004 |
| WO | WO 2004/091926 | 10/2004 |
| WO | WO-2006-096831 | 9/2006 |
| WO | WO-2012/102737 | 8/2012 |
| WO | WO-2013/154559 | 10/2013 |

\* cited by examiner

PRINTABLE RECORDING MEDIA

BACKGROUND

Inkjet printing is a non-impact printing method in which an electronic signal controls and directs droplets or a stream of ink that can be deposited on a variety of substrates. Current inkjet printing technology involves forcing the ink drops through small nozzles by thermal ejection, piezoelectric pressure or oscillation, onto the surface of a media. Inkjet printing is nowadays becoming a popular way of recording images on various media surfaces and inkjet printers have found broad applications across markets, ranging from industrial labeling to short run printing, to desktop document, pictorial imaging and large format printing for outdoor applications such as banners, displays, posters, billboard and vehicle wraps. In this printing method, the receiving media substrates play a key role in the overall image quality and permanence of the printed images. Thus, it has often created challenges to find media which can be effectively used with such techniques and which have good image quality and good adhesion capability.

BRIEF DESCRIPTION OF THE DRAWING

The drawings illustrate various examples of the present printable recording media and are part of the specification.

DETAILED DESCRIPTION

Figure 1:
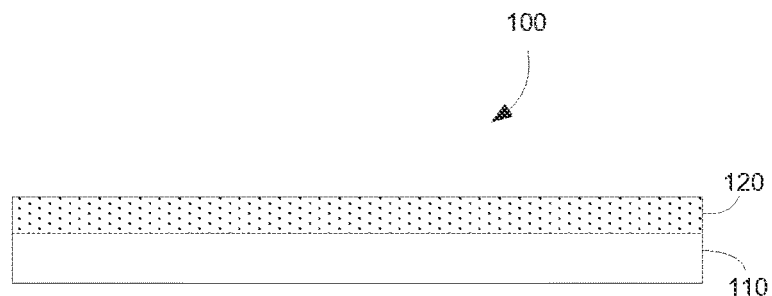
FIGS. 1, 2 and 3 are cross-sectional views of the printable recording media according to examples of the present disclosure.

A printable recording media comprising a substrate and a coating layer including a mixture of a first polymer selected from the group consisting of a polymer comprising ethylene residues and vinyl alcohol residues and a polymer comprising vinyl alcohol residues and a second polymer comprising ethylene residues, ethyl acrylate or acrylic ester residues, and maleic anhydride residues, wherein an amount of the first polymer in the mixture is about 50% to about 95% by weight. The present disclosure refers also to a method for making such printable recording media and to a method for producing printed images using said recording media.

Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present media and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 2.0 wt %, but also to include individual concentrations such as 2 wt %, 3 wt %, 4 wt %, and sub-ranges such as 5 wt % to 15 wt %, 10 wt % to 20 wt %, etc. The percent are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

The printable recording media according to the present disclosure has a fast ink absorption which enables fast drying (in a short dryer unit with elevated temperature) while, at the same time, generating an excellent image quality. In addition, the printable recording media has good rubbing resistance while having good water-fatness capabilities. The printable recording media described herein provides thus printed images and articles that demonstrate excellent image quality (good bleed and coalescence performance) and improved durability performance. As durability performance, it is meant herein that the resulting printed images are robust to dry and wet rubbing that can be done by going through printing and finishing operations (web transporting, turn bar, rewinding, slitting, sheeting, folding, etc.) or by the user handling. Furthermore, images created do not tend to run or smear upon repeated contact or may be removed easily from the printed surface.

The printable recording media provides printed images that have a high absorptivity. The resulting printed article and image have, therefore, outstanding print quality. The printable media has a fast absorption rate. By "fast absorption rate", it is meant that the water, solvent and/or vehicle of the ink can be absorbed by the media at a fast rate so that the ink composition does not have a chance to interact and cause bleed and/or coalescence issues. The absorption rate that defects free printing is dependent on the speed of the printing and amount of ink being used. The faster the printing speed and the higher the amount of ink used, the higher is the demand on faster absorption from the media. A good diagnostic plot with maximum ink density, such as secondary colors, would be prone to coalescence and a pattern of lines of the primary and secondary colors passing through area fill of primary and secondary colors would be prone to bleed. If no bleed or coalescence is present at the desired printing speed, the absorption rate would be sufficient. Bristow wheel measurements can be used for a quantitative measure of absorption on media wherein a fixed amount of a fluid is applied through a slit to a strip of media that moves at varying speeds.

Therefore, the printable recording media as described herein exhibit good adhesion, good durability and good image quality. The printable recording media is capable of receiving and retaining ink that is applied e.g., printed, thereon. Specifically, the printable recording media has a good affinity and good compatibility for the latex ink and UV curable ink. The printable recording media can thus be used, for examples, as commercial displays. When use as display items, the printable recording media will exhibit one or more of good strength and tear resistance, weather and temperature resistance, fade resistance, solvent resistance, and scratch resistance, for example, and are, therefore, well suited for outdoor use.

Some examples, in accordance with the principles described herein, are thus directed to a printable recording media comprising a substrate and a coating layer including a mixture of a first polymer selected from the group consisting of a polymer comprising ethylene residues and vinyl alcohol residues and a polymer comprising vinyl alcohol residues and a second polymer comprising ethylene residues, ethyl acrylate or acrylic ester residues and maleic anhydride residues. An amount of the first polymer in the mixture is about 50% to about 95% by weight. In some examples, the coating layer is made of a mixture that is extrudable, which means that the mixture, after melting, is able to form a stable film using an extruder. The coating layer can thus be considered as an extruded coating layer, i.e. the coating layer is in an extruded form. The coating layer has thus its own three-dimensional shape or profile imparted from the extrusion die and chill roll and is in a form for use as an ink-receiving layer for inkjet printing applications.

Figure 2:
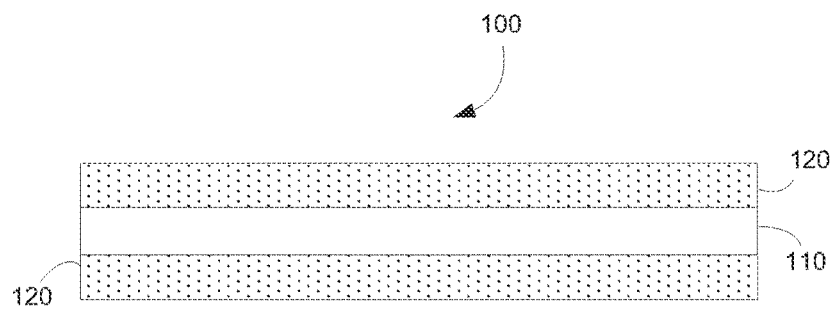
Figure 3:
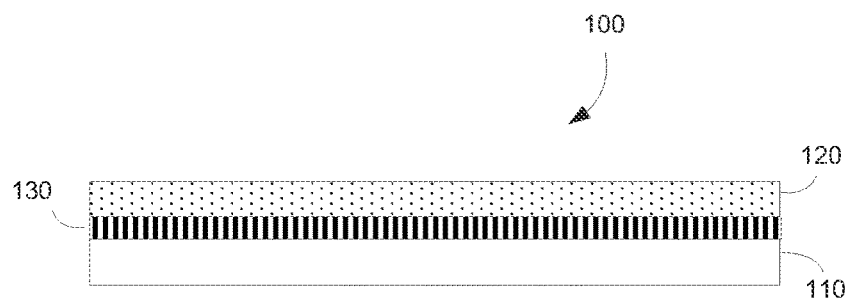
Figure 4:
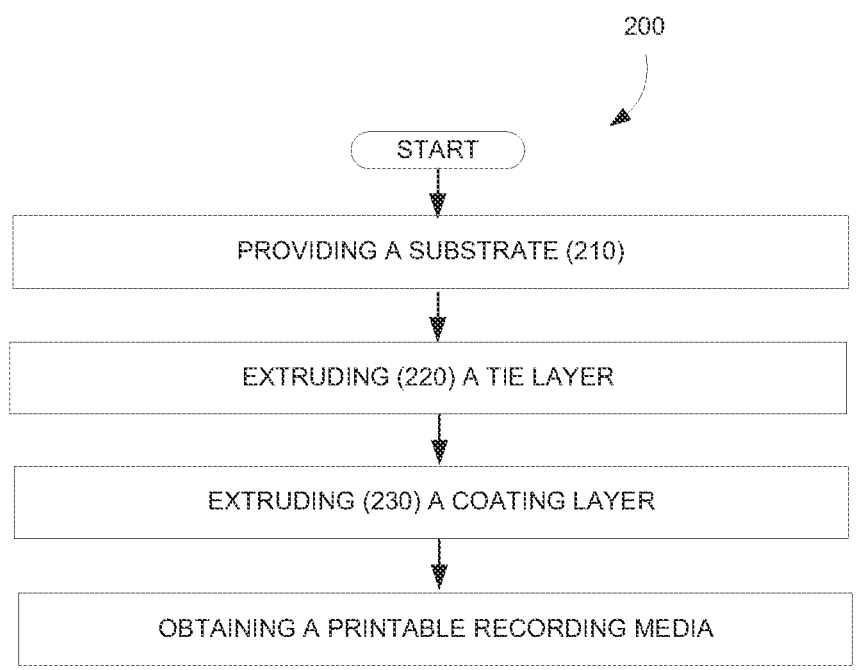
FIG. 4 is a flowchart illustrating a method for producing the printable recording media according to some examples of the present disclosure.

FIG. 1 and FIG. 2 illustrate the printable recording media (100) as described herein. As illustrated in FIG. 1, the printable media (100) encompasses a bottom substrate (110) and a coating layer (120). The coating layer (120) is applied on one side of the bottom substrate (110). If said coated side is used as an image-receiving side, the other side, i.e. backside, may not have any coating, or may be coated with other chemicals (e.g. sizing agents) or coatings to meet certain features such as to balance the curl of the final product or to improve sheet feeding in printer, in some examples, such as illustrated in FIG. 2, the coating layers (120) are applied to both opposing sides of the substrate (110). The double-side coated media has thus a sandwich structure, i.e. both sides of the substrate (110) are coated with the same coating and both sides may be printed. FIG. 3 illustrates another example of the printable media (100); such example encompasses a bottom substrate (110), a coating layer (120) and a tie layer (130) that is extruded on the substrate (110), below the coating layer (120). The tie layer can be considered as being part of the substrate. FIG. 4 illustrates an example of a method (200) for making a printable recording material that encompasses providing (210) a substrate (110); extruding (220) a tie layer (130) and then extruding (230) a coating layer (120) in order to obtain a printable recording material (100).

An amount of the coating layer (120) on the printable recording media (100), in the dry state is, at least, sufficient to hold the ink that is to be applied to the printable media. The substrate (110) can have a thickness along substantially the entire length ranging between about 0.01 mm (i.e. about 12 gsm) and about 0.5 mm (i.e. about 600 gsm). In some examples, the coating layer (120) is disposed on the substrate (110) and forms an ink-receiving layer having a coat-weight in the range of about 1 to about 30 gram per square meter (g/m$^2$ or gsm) per side, or in the range of about 5 to about 20 gsm, or in the range of about 8 to about 15 gsm per side In some examples, the printable recording media comprises a substrate, that is a woven layer (scrim layer) and a coated layer (i.e. ink-receiving material) disposed on one or both of the surfaces of the substrate layer. In some other examples, the printable recording media comprises a substrate and a tie layer, disposed on the substrate, and a coated layer (i.e. ink-receiving material) disposed on the surface of the tie layer. In yet some other examples, the printable recording media comprises a substrate that is a woven layer (scrim layer) and a tie layer disposed on one or both sides of the substrate, and a coated layer (i.e. ink-receiving material) that is disposed on a surface of the tie layer or that is disposed on the surfaces of each of the tie layers.

Some other examples, in accordance with the principles described herein, are directed to a printable recording media, which comprises a substrate that is a woven layer (scrim layer), a tie layer which is an extruded polymer film applied on both side of the scrim, and a coated layer, as an ink-receiving material, applied over the tie layer, on one or both sides of the scrim substrate. The coated layer comprises a mixture of a first polymer comprising ethylene residues and vinyl alcohol residues and a second polymer comprising ethylene residues, ethyl acrylate or acrylic ester residues and maleic anhydride residues. The amount of the first polymer in the mixture is about 50% to about 95%, or about 65% to about 85% by weight.

In some instance, the present disclosure refers to an article comprising: a planar scrim having a first and a second side; an extruded polymer film, on the first side and on the second side of the planar scrim; and an extruded ink-receiving material, applied on the extruded polymer film, on one or on both first and second side of the planar scrim; the extruded ink-receiving material comprising a mixture of a first polymer comprising ethylene residues and vinyl alcohol residues and a second polymer being a terpolymer of ethylene residues, ethyl acrylate residues and maleic anhydride residues.

The Substrate

As illustrated in FIG. 1, the printable media (100) contains a substrate (110) that supports the coating layer (120) and that acts as a bottom substrate layer. The substrate is a media substrate or media supporting base. Such substrate (i.e. supporting material or base substrate) can be considered as a base print substrate or as a supporting substrate (supporting base) that contains a material that serves as a base, or support, upon which the pre-coat layer and the top-coating layer are applied. In some examples, the substrate is a planar scrim.

The substrate provides integrity for the resultant printable media. The substrate (110) can be any substance that provides one or more of structure and integrity to the coating layer (120) and added adhesion to further support layers so that the printable media may be employed for their intended use. The coating layer, or ink-receiving material or layer (120), is associated with the support, which means that the relationship between the coating layer (120) and the substrate (110) is one in which the coating layer exhibits substantially non-removable adherence to the support. One or more coating layers may be associated with the support. The phrase "substantially non-removable adherence" means that the average peel three is equal to or greater than about 7 newton per 50.8 mm wide strip with crosshead speed at 50.8 mm per minute measured by an Instron device (Instron Industrial Products, Grove City Pa.).

The substrate (110) may comprise one or more components that provide for different functions within the coating layer (120) (or ink-receiving material). The components may have any number of forms such as, for example, layers. Examples, by way of illustration and not limitation, of components that may form part of the support include tie components, structure-providing components (substrates), scrims (woven and non-woven material), moisture harriers, vapor/air barriers and adhesion promoters, for example.

The substrate (110), or one or more of the components of the substrate (110), may be translucent, transparent, or opaque and may be of any color such as, for example, white or grey, depending on the end use of the ink-printable composition with a printed image thereon. In some examples, the one or more components of the substrate are in the form of layers associated with one another in a predetermined manner. The layers may be in the form of a film, sheet, woven scrim and non-woven scrim, for example.

The phrase "non-woven scrim" refers to a layer that is not truly woven but rather pseudo woven, that is, the non-woven scrim has woven characteristics as the result of long fibers or filaments being bonded together by one or more of chemical treatment (including, e.g., solvent treatment), mechanical treatment (e.g., embossing), and heating.

In some examples, the substrate comprises at least one structure-providing component or substrate, which provides additional physical integrity and form to the printable recording media. The nature of the substrate is dependent on one or more of an intended use of the printable recording media, the nature of the coating layer (ink-receiving material), a designed tear strength, a designed tensile strength, a designed surface texture and a designed longevity, for example.

The substrate may be a composition comprising ingredients selected from the group consisting of polyolefins, polyesters, polyurethanes, polyvinyl chlorides, polyamides, polystyrene, ethylene vinyl alcohol, polylactic acid, cellulose and combinations of two or more of the above. In some examples, the substrates may be fabricated from polyethylene, polypropylene, polymethylpentene, polybutylene, polyethylene terephthalate, polystyrene, polyvinyl chloride, polyurethane, polyacrylate, polyvinyl acetate, polysulfone, polyvinylidene chloride, polyethylene methyl acrylate, polyethylene methacrylic acid, polyethylene ethyl acrylate, nylon, polyvinyl pyrillidone, polyether ester, polyether amide, polycarbonate, styrene acrylonitrile polymer, polymethyl methacrylates, cellulosics, fluoroplastics, acrylonitrile butadiene styrene polymer, polyethylenevinyl alcohol, and polylactic acid, and copolymers (two or more monomer residues) and combinations of two or more of the above.

The substrate may be in the form of an extruded film or layer, a woven layer (scrim), non-woven scrim, or paper. The substrate of the printable media can be fabricated from polyethylene (PE), polypropylene (PP), polyethylene terephthalate (PET), ethylene vinyl acetate (EVA), polystyrene (PS), polycarbonate, and polyamide polymer and combinations of two or more of the above. In some examples, the substrate is fabricated from one or both of low density polyethylene (LDPE) and high density polyethylene (HDPE). In some other examples, the substrate is fabricated from PE. In some other examples, the substrate is a woven layer (scrim). In yet some other examples, the substrate is a woven layer (scrim) made of one or both of LDPE and HDPE. The supporting substrate can thus be a scrim banner which is a woven-core of polymer tapes (LDPE, HDPE, PVC, and Polyester, for example) with an extruded coating layer locking them together. Such products are available from Fabrene Corporation or from Interwrap Inc.

The thickness of the substrate depends on one or more of the physical form of the substrate (e.g., extruded layer, extruded film, woven scrim, or non-woven scrim), the nature of the function of the substrate (for example, provide one or more of stiffness (rigidity), tear and tensile strength, opacity, longevity, and ability to be recycled), the nature of the coated layer (i.e. ink-receiving material), the nature of the material with which the substrate is associated, for example. In some examples, the thickness of the substrate is about 10 to about 500 microns ($\mu m$), or about 30 to about 400 microns ($\mu m$), or about 50 to about 300 microns ($\mu m$), or about 60 to about 200 microns ($\mu m$).

In some examples, the substrate (110) includes a tie layer or component (130), which provides for substantially non-removable adherence of the coated layer (i.e. ink-receiving material) to the substrate. It is to be understood that use of the tie component is optional and is based on the relative degree of ability to bond and compatibility between the ink-receiving material and the substrate. The tie layer (130) can also be referred to as an adhesion layer. The tie layer (130) can be considered as a component of the substrate (110).

In some examples, the nature and the selection of the tie component may be dependent on one or more of the composition of the coated layer (i.e. ink-receiving material) and of a component of the substrate to which the coated layer is to be bonded or attached. In some examples, one or both of the nature and the selection of a tie layer may be independent of such factors and simply dependent on obtaining sufficient adhesion of the layers to be adhered.

In some examples, the tie layer or component is an extruded polymeric film or co-extruded polymeric film. The tie layer or adhesion layer (130), that is part of the substrate (110), can be made of polymeric polymers. Said polymers can comprise, for examples, butyl acrylate residues, maleic anhydride residues and ethylene residues. The polymeric polymers of the tie layer can also include terpolymer comprising ethylene residues, acrylic ester, and maleic anhydride. In some other examples, the tie layer is made of polymeric polymers that comprises butyl acrylate residues in an amount of about 5% to about 10% by weight of the second polymer, maleic anhydride residues in an amount of about 3% to about 4% by weight of the second polymer, and ethylene residues. In yet some other examples, the tie layer or adhesion layer (130), which is part of the substrate (110), is made of polymeric polymers having a melt index number of about 5 to about 15. By way of illustration and not limitation, the polymeric polymer of the tie layer can be commercially available from Arkema under the tradename Lotader®3210, Lotader®5500 or Lotader®4700.

The tie layer can also be made of a material that can bond to various substrates such as polyolefins (e.g., ethylene-based, propylene-based, polyethylene and polypropylene blends), polyamides, polyvinyl alcohols, polyethyl oxazolines, polyesters, polycarbonates, polystyrenes, polyethylene vinyl alcohol, and polyethylene acrylate copolymers, for example. Examples, by way of illustration and not limitation, of the composition of suitable tie components include extrudable resins such as EVA resins, modified EVA resins (modified with acid, acrylate, maleic anhydride, individually or in combinations), polyethyleneimine, anhydride modified polyolefins (for example, anhydride modified polypropylene, anhydride modified polyethylene, anhydride modified ethylene vinyl acetate, anhydride modified ethyl methyl acrylate and anhydride modified ethyl acrylic acid), and combinations of two or more of the above, for example.

The thickness of the tie layer depends on one or more of the nature of the coated layer (i.e. ink-receiving material), the nature of the component of the substrate to which the tie layer binds, the physical form of the tie component, and the surface roughness of the support to which the tie layer binds. In some examples, the thickness of the tie layer is about 0.5 to about 100 ($\mu m$) microns, or about 5 to about 75 ($\mu m$) microns, or about 10 to about 50 ($\mu m$) microns.

The Coating Layer

The printable media contains a coating layer (120) disposed onto the substrate (110). The coating layer (120) can also be considered as an ink-receiving material or layer. Without being limited by any theory, it is believed that coating layer (120) or ink-receiving material layer is designed to provide a "high" absorption rate of the inks that is deposited thereon and thus allow good bleed and coalescence performance. In some example, said coating layer (120) is present on, at least, one side of the substrate. In some other examples, the coating layer (120) is present on both sides of the substrate.

In accordance with the principles described herein, the coating layer or ink-receiving material (110) comprises a mixture of polymers. The polymers may be linear or branched or a combination thereof. A linear polymer comprises a linear chain of atoms and a branched polymer comprises a branched chain of atoms. The relationship of the different monomer residues in the polymer may be random, alternating, periodic, or block, for example, or a combination of two or more thereof. The phrase "monomer residue" or "residues" as used herein refers to a structural unit or building block or repeat unit of a polymer and is derived from a monomer in that it results from the polymerization of the monomer. For example, by way of illustration and not limitation, a monomer that comprises an unsaturation that is a double bond between carbon atoms, when polymerized, results in monomer residues in a polymer where the monomer residues comprise a single bond between the two carbon atoms, the double bond thus becoming saturated during the polymerization process. The monomer residues are not the monomer itself but are derived from the monomer.

Each of the polymers comprises from about 100 to about 500,000 monomer residues, or from about 300 to about 400,000 monomer residues, or from about 500 to about 300,000 monomer residues, or from about 1,000 to about 200,000 monomer residues, or from about 2,000 to about 100,000 monomer residues, or from about 5,000 to about 50,000 monomer residues. The number of monomer residues can depend on the extrudability of the polymer mixture, the nature of the ink to be applied to the coating layer, the nature of the polymers that form the coating layer, the physical properties of the coating layer for the extrusion process or the physical properties of the coating layer in extruded form, for example.

In some examples, the coating layer or ink-receiving material (120) can be tailored to a particular ink, for example, by adjusting the weight percentage of the monomer residues in the polymers that are employed to prepare the coating layer or ink-receiving material (120) and also by adjusting the weight percentages of the first and second polymers in the mixture. In some examples, the average molecular weight (grams/mole) of the polymers is from about 1,000 to about 1,000,000; or from about 5,000 to about 900,000; or about 10,000 to about 800,000; or from about 50,000 to about 700,000; or from about 100,000 to about 500,000.

The coating layer or ink-receiving material (120) includes a mixture of a first polymer and of a second polymer. At least one of the polymers arbitrarily referred to herein as a first polymer, is selected from the group consisting of polymers comprising ethylene residues and vinyl alcohol residues and polymers comprising vinyl alcohol residues. The phrase "vinyl alcohol residue" refers to the state of the residue in the final polymer and is independent of the manner in which a polymer that comprises a vinyl alcohol residue may be prepared. For example, by way of illustration and not limitation, a first polymer comprising ethylene residues and vinyl alcohol residues may be prepared by polymerizing ethylene and vinyl acetate and then hydrolyzing the acetate moieties to produce the free alcohol moiety of a vinyl alcohol residue.

In some examples, a percentage by weight of vinyl alcohol residues, in the first polymer, is from about 50% to about 100% or from about 55% to about 90% or from about 55% to about 80% or from about 55% to 70%. In some other examples, in the coating layer, the first polymer comprises ethylene residues and vinyl alcohol residues and wherein the amount of vinyl alcohol residues is about 50% to about 99% by weight.

The percentage is based on weight, that is, the weight of one of the monomers, in the monomer mixture, to be polymerized and the total weight of the monomer mixture. It should be noted that a percentage by weight for the vinyl alcohol residues of 100% means that the polymer comprises only vinyl alcohol residues while a percentage by weight of less than 100% means that the polymer comprises also other residues (ethylene residues for instance).

In some examples, the percentage by weight of ethylene residues in the first polymer is from about 0% to about 50%, or about 1% to about 45%, or about 5% to about 40%, or about 10% to about 35%, or about 20% to about 30%. In some other examples, a percentage by weight of ethylene residues in the first polymer is of about 1% to about 50%.

The ratio of the percentage of vinyl alcohol residues to the percentage of ethylene residues in the first polymer is about 50 to 50, or about 60 to about 40, or about 65 to about 35, or about 70 to about 30, or about 75 to about 25, or about 80 to about 20, or about 85 to about 15, or about 90 to about 10, for example.

In some examples, the vinyl alcohol residues, in the first polymer, are in the range of about 50% to about 95% with the corresponding range of the ethylene residues in the range of about 50% to about 5%. In some other examples, the vinyl alcohol residues, in the first polymer, are in the range of about 60% to about 90% with the corresponding range of the ethylene residues in the range of about 40% to about 10%. In yet some other examples, the vinyl alcohol residues, in the first polymer, are in the range of about 50% to about 80% with the corresponding range of the ethylene residues in the range of about 50% to about 20%.

The first polymer may be commercially available. Examples, by way of illustration and not limitation, of commercially available polymers that are suitable as the first polymer include Soarnol®A4412 (available from Noltex, L.L.C., LaPorte, Tex. or Soarus L.L.C. Arlington Height, Ill.) (composition of about 56% vinyl alcohol residues and about 44% ethylene residues with melt index number at 12); Soarnol®E3808 (available from Noltex, L.L.C. or Soarus L.L.C.) (composition of about 62% vinyl alcohol residues and about 38% ethylene residues with melt index number at 8), and Soarnol®AT4403 (available from Noltex, L.L.C. or Soarus (composition of about 56% of vinyl alcohol residues and about 44% ethylene residues with melt index number at 3), for example. As indicated above, other percentages of ethylene residues and vinyl alcohol residues in the first polymer may be employed.

In some examples, the first polymer is an ethylene-vinyl alcohol (EVOH) co-polymer, The term "co-polymer" refers to a polymer composition that is the product of two or more different monomers or which is the product of two or more different polymers that are used to form the polymeric structure or backbone. The EVOH co-polymer is a co-polymer of ethylene and vinyl alcohol. The amounts of ethylene and vinyl alcohol are selected so that the EVOH co-polymer exhibits a rather high crystallinity. In other words, the EVOH co-polymer utilized herein is not highly amorphous. Without being linked by any theory, it is believed that not highly amorphous EVOH has a high crystallization temperature compared to other types of EVOH. The crystallization temperature represents the temperature that the material starts to crystallize as the temperature drops. The high crystallization temperature indicates that the material has a high tendency to form a crystal structure. The high tendency to form a crystal structure results in a less amorphous structure.

In some examples, the first polymer of the coating layer comprises an ethylene-vinyl alcohol co-polymer with a crystallization temperature that is above 150° C. (degrees Celsius). In some other examples, the first polymer of the coating layer comprises an ethylene-vinyl alcohol co-polymer that has a glass transition temperature of less than 75° C. (degrees Celsius) and above 55° C. In yet some other examples, the first polymer of the coating layer comprises an ethylene-vinyl alcohol co-polymer with a melting point temperature of above 160° C. or with a melting point temperature of above 170° C.

Ethylene-vinyl alcohol (EVOH) co-polymers can be commercially available, for examples, from Nippon Gohsei (Osaka, Japan) under the trade name Soarnol® or from the U.S. supplier for Nippon Gohsei, Soarus EVOH co-polymers are also available commercially from Eval Company of America of Lisle under the trade name Eval®. In some examples, the first polymer is an ethylene-vinyl alcohol (EVOH) co-polymer available under the tradename Soarnol®E3808.

At least one of the polymers (arbitrarily referred to herein as a second polymer) of the coating layer or ink-receiving material comprises ethylene residues, ethyl acrylate or acrylic ester residues and maleic anhydride residues. In some examples, the second polymer of the ink-receiving material comprises ethylene residues, ethyl acrylate residues and maleic anhydride residues. In some other examples, the second polymer of the ink-receiving material comprises ethylene residues, acrylic ester residues and maleic anhydride residues. The second polymer can thus be a terpolymer of ethylene, ethyl acrylate and maleic anhydride or the second polymer can be a terpolymer of ethylene, acrylic ester and maleic anhydride. In some examples, the second polymer is a terpolymer of ethylene, ethyl acrylate and maleic anhydride.

A percentage by weight of ethylene residues, in the second polymer, can be from about 50% to about 90%, or about 55% to about 85%, or about 60% to about 80%, or about 60% to about 70%, for example. A percentage by weight of ethyl acrylate or acrylic ester residues in the second polymer can be about from 10% to about 50%, or from about 20% to about 45%, or from about 25% to about 40%, for example. A percentage by weight of maleic anhydride residues in the second polymer can be about 0.01% to about 10%, or about 0.01% to about 5%, or about 0.05% to about 4%, or about 0.01% to about 1%.

In some examples, the amount of ethylene residues in the second polymer is from about 70% to about 80%, the amount of ethyl acrylate or acrylic ester residues in the second polymer is about from 20% to about 30% and the amount of maleic anhydride residues in the second polymer is from about 0.05% to about 5%.

One example, by way of illustration and not limitation, of a commercially available polymer that is suitable as the second polymer is Lotader®4720 (available from Arkema). Other examples of a commercially available polymer that is suitable as the second polymer is Lotader®4503 (available from Arkema). The composition of Lotader®4720 polymer is about 60% to 80% of ethylene residues, about 20% to 30% of ethyl acrylate and about 0.1% to 3% of maleic anhydride residues. The composition of Lotader®4503 polymer is about 70% to 80% of ethylene residues, about 20% to 30% of acrylic ester and about 0.1% to 3% of maleic anhydride residues. In some examples, the second polymer does not contain any vinyl acetate monomers.

Another example, by way of illustration and not limitation, of a commercially available polymer that is suitable as the second polymer is a terpolymer consisting of ethylene, ethyl acrylate and maleic anhydride residues such as Lotader®4700 (available from Arkema).

The polymers, utilized in examples in accordance with the principles described herein, may be obtained by polymer synthesis from appropriate monomers or monomer residue precursors or some of the polymers may be obtained commercially. The term "monomer" or "monomer unit" means a molecule capable of undergoing polymerization to form a polymer. A monomer residue precursor is a monomer that results in the desired monomer residue after polymerization. For example, a polymer comprising ethylene residues and ethyl acrylate residues may be prepared by copolymerizing ethylene and ethyl acrylate in the resulting polymer to give the desired polymer with ethyl acrylate residues. In this particular example, ethyl acrylate monomer is a monomer residue precursor. Examples of approaches for preparing polymers, by way of illustration and not limitation, include emulsification or emulsion polymerization, free radical polymerization, bulk polymerization, transition metal catalyzed coupling, condensation (step-growth) polymerization, living polymerization, living radical polymerization, addition (chain reaction) polymerization (anionic, etc.), coordination polymerization, ring opening polymerization, solution polymerization, plasma polymerization, radical polymerization, atom transfer radical polymerization, and reversible addition fragmentation, for example.

The mixture of polymers that form the coating layer (or ink-receiving layer) is a physical mixture obtained by mixing the polymers together. Mixing may be accomplished by such methods that include but are not limited to blending a mixture of pre-dried individual polymer pellets in a mixing hopper prior to being conveyed to extruder or by compounding a mixture of (pre-dried individual polymer pellets into a single pellet, for example. The extent of mixing should be that sufficient to provide for one or both of uniform performance during extrusion and uniformity of the extruded product.

A percentage by weight of the first polymer in the coating layer (or ink-receiving layer) can be from about 50% to about 95%, or about 55% to about 90%, or about 60% to about 80%, for example. As mentioned above, the percentage of the first polymer and the second polymer in the ink-receiving material is based on weight, that is, the weight of the first polymer and the total weight of the combined polymers (in this example, first and second polymers).

In some examples, the ratio of the percentage of the first polymer to the percentage of the second polymer, in the coating layer, is about 60 to about 40. In some other examples, the ratio of the percentage of the first polymer to the percentage of the second polymer is about 70 to about 30. In yet some other examples, in the coating layer, the ratio of the percentage of the first polymer to the percentage of the second polymer is about 80 to about 20.

In some examples, the percentage of the first polymer in the mixture of first and second polymer, in the coating layer, is in the range of about 50% to about 95% with the corresponding range of the second polymer of about 5% to about 50%. In some examples the percentage of the first polymer in the mixture is in the range of about 70% to about 95% with the corresponding range of the second polymer in the range of about 5% to about 30%. In yet some examples the percentage of the first polymer in the mixture is in the range of about 80% to about 90% with the corresponding range of the second polymer in the range of about 10% to about 20%.

In some examples, in the coating layer of the printable recording media as defined herein, the amount of the first polymer in the mixture is about 80% to about 90% by weight and the amount of the second polymer in the mixture is about 10% to about 20% by weight and wherein the second polymer is a terpolymer of ethylene, ethyl acrylate and maleic anhydride.

In some examples in accordance with the principles described herein, the coating layer (i.e. ink-receiving material) according to the present disclosure may include one or more additives such as fillers, pigments, processing aids, and performance aids, for example. In an example, the additives are added to the mixture before the extrusion process either during the initial mixture preparation or in a separate mixing step.

In some examples, the coating layer (i.e. ink-receiving material) according to the present disclosure has a coating weight of at least 10 g/m$^2$ gsm) or has a coating weight of at least 20 g/m$^2$.

Method for Producing the Printable Recording Material

In some examples, according to the principles described herein, a method of making a printable recording media (100) with a substrate (110) having a coating layer (120) is provided. The coating layer, or ink-receiving layer, (120) includes a mixture of a first polymer selected from the group consisting of a polymer comprising ethylene residues and vinyl alcohol residues and a polymer comprising vinyl alcohol residues and a second polymer comprising ethylene residues, ethyl acrylate or acrylic ester residues and maleic anhydride residues wherein the amount of the first polymer in the mixture is about 50% to about 95% by weight. Such method encompasses providing a substrate (110) and extruding a coating layer (120), including a mixture of first and second polymer on, at least, one side of the substrate wherein the amount of the first polymer in the mixture is about 50% to about 95% by weight onto said substrate.

In some examples, the coating layer (120) is applied to both sides of the substrate. In some other examples, a tie layer (130) is applied to one or both surfaces of the substrate (110), before the extrusion of the coating layer (120).

An example of a method (200) for making a printable recording material, in accordance with the principles described herein, is shown in FIG. 4. FIG. 4 illustrates an examples of a method (200) for preparing an printable recording media, that comprises: providing (210) a substrate comprising a first side and a second side; extruding (220) a tie layer on at least a first side of the substrate; and extruding (230) a coating layer or (an ink-receiving material), in the form of an extruded film, on one or both of tie layer (on the first side and the second side of substrate, respectively). The extrusion steps above may be carried out simultaneously or one or more of the extrusion steps may be carried out independent of other extrusion steps.

Thus, some other examples, in accordance with the principles described herein, are directed to a method of preparing a printable recording media that comprises: providing a substrate (110) that is a planar scrim having a first side and a second side; extruding a tie layer, that is a extruded polymer film, on the first side and on the second side of the substrate; and extruding a coating layer or (an ink-receiving material) on the tie layer, on one or both sides.

The coating layer or ink-receiving layer (120) can be prepared by extrusion processes. For example, the coating layer may be formed together by co-extrusion, extrusion coating, hot melt extrusion, cast extrusion process, modification of cast extrusion or coating operation, lamination, blown extrusion process, film extrusion, and sheet extrusion. The extrusion system may comprise, by way of illustration and not limitation, a vertical single screw extruder or a horizontal single screw extruder. In some examples, the coating layer or ink-receiving layer is formed on the substrate by an extrusion process where the support is assembled either prior to or during the extrusion process. Accordingly, such extrusion processes, e.g., co-extrusion, may be employed to assemble other components of the substrate prior to the extrusion of the ink-receiving layer. As used herein, the terms "extrude" or "extrusion" or "extrusion process" refer to a process wherein the material is heated to a predetermined temperature, which is a temperature at, or above, the processing temperature or melting temperature of the extruded materials, and then deposited on a moving support at a substantially uniform thickness. The extrusion steps of the extrusion processed above may be carried out simultaneously or one or more of the extrusion steps may be carried out independent of other extrusion steps.

The coating layer or ink-receiving layer (120) can be fabricated using an extruder and an extrusion process, which can involve melting the material to be extruded, which may be in the form of pellets, beads, flakes, or powder, for example. Depending on the nature of the material to be extruded, the material may also include an extrusion liquid. The melted material is then run through a die, such as, for example, by applying heat and force to the melted material, to produce an extruded form or a three-dimensional profile shape such as, for example, a film or a sheet. In some examples, an extruded form of the coating layer or ink-receiving layer is prepared by subjecting a mixture of the first polymer and the second polymer to an extrusion process.

The coating layer or ink-receiving layer composition can be formed by co-extruding a mixture of first polymer and second polymer onto the surface of a substrate such as, for example, a film of a polyolefin substrate, or by co-extruding a mixture of first polymer and second polymer onto the surface of a base substrate along with another layer such as a tie layer. The temperature and extrusion speed employed in a particular extrusion process depend on one or more of the nature of the coating layer material, the nature of the substrate or of other components of the support, and the nature of the extruder, for example. Co-extrusion is a process wherein two different polymer blends are extruded in two different extruders at the same time and then come in contact at the die and stick together.

Method for Producing Printed Images

In some examples, the printable recording media as described herein is an inkjet printable recording media that may be employed for use with inkjet ink compositions. It means therefore, that the media is particularly well adapted in order to be printed on with ink using inkjet technology. In some other examples, the printable recording media particularly well adapted in order to be printed on with ink composition including latex (latex inkjet ink composition) and UV curable ingredients (UV-curable inkjet ink) and combinations thereof. As used herein, the wording "latex inkjet ink" refers to an ink composition containing polymeric latex. The phrase "UV-curable inkjet ink" means an ink composition containing UV-curable materials. The phrase "inkjet ink" means an ink that is suited for use in one or both of an inkjet device and an inkjet printing process. By inkjet composition, it is meant herein that the composition is very well adapted to be used in an inkjet device and/or in an inkjet printing process.

In accordance with the principles described herein, a method for producing printed images, or printing method, includes providing a printable recording media such as defined herein; applying an ink composition on the coating layer of said print media, to form a printed image; and drying the printed image, to provide a printed image. In some examples, said printing process further comprises a curing step.

In some examples, the ink composition is applied onto the recording media via inkjet nozzles. The nozzles project a stream of droplets of the ink composition onto said ink recording material to form the desired printed image. The ink composition may be applied on the printable recording media via any suitable inkjet printing technique. Non-limitative examples of such inkjet printing techniques include thermal, acoustic, continuous and piezoelectric inkjet printing.

In some examples, the ink composition is a latex inkjet ink composition, in some other examples, the ink composition is a UV-curable inkjet ink composition.

The printable recording media can use with any suitable inkjet printer and with any inkjet ink that is used for inkjet printing. One of such printer is HP Designjet® L25500 and HP Designjet® L65500 (Hewlett-Packard Corporation). The printable recording media can be printed at a broad range of temperatures depending on, for example, the nature of the printing apparatus. In some examples, by way of illustration and not limitation, the printable recording media can be printed on HP Designjet® L25500 (or L26500 or LX850 or L3000) printer with the curing zone temperature range of about 70° C. to about 100° C., or about 70° C. to about 130° C., or about 80° C. to about 130° C. or about 80° C. to 100° C. Curing of the present printable recording media, at lower temperature, provides enhanced performance of the media during the printing and curing processes and in use as a printed material.

The printed image may be dried after printing. The drying stage may be conducted, by way of illustration and not limitation, by hot air, electrical heater or light irradiation (e.g., IR lamps), or a combination of such drying methods. In order to achieve best performances, it is advisable to dry the ink at a maximum temperature allowable by the print media that enables good image quality without deformation. Examples of a temperature during drying are, for examples, from about 60° C. to about 130° C., or from about 70° C. to about 90° C. The printing method may further include a drying process in which the solvent (such as water), that can be present in the ink composition, is removed by drying. As a further step, the printable recording media can be submitted to a hot air curing systems.

In some examples, the inkjet ink composition, used in the printing method, comprises one or more colorants that impart the desired color to the printed item. As used herein, "colorant" includes dyes, pigments, and/or other particulates that may be suspended or dissolved in an ink vehicle. The colorant can be present in the ink composition in an amount required to produce the desired contrast and readability. In some examples, the inks comprise pigments as colorants. Pigments that can be used may be organic or inorganic and include, for example, self-dispersed pigments and non-self-dispersed pigments. The pigment can be of any color including, but not limited to, black, blue, brown, cyan, green, white, violet, magenta, red, orange and yellow, as well as spot colors from mixtures thereof.

In many examples, the colorant is suspended, dispersed or dissolved in a suitable ink vehicle. As used herein, "ink vehicle" is defined to include any liquid composition that is used to carry colorants, including pigments, to an ink-receiving material. A wide variety of liquid vehicles may be used. In some examples, the liquid vehicle may include one or more of a variety of different agents, including without limitation, surfactants, solvents and co-solvents, buffers, biocides, viscosity modifiers, sequestering agents, stabilizing agents, and water, for example.

In some examples, the ink composition is a latex inkjet ink composition, meaning therefore that the ink contains polymeric latex. The polymeric latex can be defined as a group of preparations consisting of stable dispersion of polymeric micro-particles dispersed in the aqueous vehicle of the ink. The polymeric latex can be natural latex or synthetic latex. The polymeric latex can be cationic, anionic, or amphoteric polymeric latex. In some examples, the polymeric latex is selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers.

In some examples, the ink composition is a UV-curable inkjet ink, meaning therefore that the ink contains UV-curable components. Examples of UV-curable components includes, for examples: 2-PEA (2-phenoxyethyl acrylate); BCEA (beta-carboxyethyl acrylate); EOEOEA (ethoxy-ethoxyethyl acrylate); GPTA (glycerol propoxylate triacrylate); HDODA (hexane diol diacrylate); PETA (pentaerythritol tri/tetra acrylate); PNPGDA (propoxylated neopentyl glycol diacrylate); TMPEOTA (trimethylolpropane ethoxy triacrylate); TMPTA (trimethylolpropane triacrylate); TRPGDA (tripropylene glycol diacrylate) or TTEGDA (tetraethylene glycol diacrylate).

The printable recording media disclosed herein may be used to prepare display items using any suitable inkjet printer that is used for inkjet printing. Using an appropriate printer, ink may be applied to the ink-receiving layer of the printable recording media in order to create a desired display comprising a printed image with subsequent drying or curing of the image following application of the ink. Some examples, in accordance with the principles described herein include, a display comprising a printable recording media an ink design or ink pattern or image that is applied on the ink-receiving material (or coating layer). The particular nature and configuration of the components of the printable recording media (such as the nature of the first and second polymers and the nature of the supporting substrate) may be chosen for a desired use, which includes, by way of illustration and not limitation, indoor and outdoor signs, banners, (e.g., outdoor banners, indoor banners, tradeshow banners and event banners), point of purchase displays, building wraps, billboards, displays, and wall murals, for example.

In some examples, the present disclosure also refers to a display comprising a printable recording media containing a substrate; a coating layer including a mixture of a first polymer selected from the group consisting of a polymer comprising ethylene residues and vinyl alcohol residues and a polymer comprising vinyl alcohol residues and a second polymer comprising ethylene residues, ethyl acrylate or acrylic ester residues and maleic anhydride residues wherein the amount of first polymer in the mixture is about 50% to about 95% by weight and an inked design or image applied to the coating layer.

For the above uses, examples of supporting substrate include, but are not limited to, resin coated papers (or photo-base papers), papers, clear films, translucent films, scrim banners (woven and non-woven), other types of banners, coated papers, fabrics, art papers (e.g., water color paper), and plastic film, for example. As mentioned above, one of the components of the supporting substrate chosen may comprise a porous or non-porous surface. In an example, at least one of the components of the support is paper. In another example at least one of the components of the support is a scrim banner, which is a woven-core of polymer tapes (LDPE, HDPE, PVC, and polyester, for example) with an extruded coating layer locking them together. Such products are available from PGI Corporation (Ontario, Canada), Engineered Coated Products (BC, Canada), Heytex (Germany), Maiweave (Springfield, Ohio), or Interwrap (Vancouver, Wash.).

EXAMPLES

Ingredients:

TABLE 1

| Ingredient name | Nature of the ingredient | supplier |
| --- | --- | --- |
| Soarnol ®3808 (*) | Ethylene-vinyl alcohol copolymer | Soarus L.L.C. |
| Lotader ®4720 | Terpolymer of ethylene, ethyl acrylate and maleic anhydride | Arkema |
| Lotader ®4503 | Terpolymer of ethylene, acrylic ester and maleic Anhydride | Arkema |
| Lotader ®3210 | Terpolymer of ethylene, acrylic ester and maleic anhydride | Arkema |

(*) Soarnol ®3808 is an ethylene vinyl alcohol copolymer having ethylene content of 38%; with a melting point of 173° C. and a crystallization temperature of 152° C.

Example 1—Printable Recording Media

Different coating layers (120) are formulated using different amount and polymers. Such formulations are expressed in Table 2. The numbers represent the weight percent (wt %) based on the total weight of each coating layer. Examples 1, 6 and 7 are comparative coating layers; examples 2-5 are coating layers according to the present disclosure.

TABLE 2

| | Coating layer samples | | | | | | |
| --- | --- | --- | --- | --- | --- | --- | --- |
| | Example 1 | Example 2 | Example 3 | Example 4 | Example 5 | Example 6 | Example 7 |
| Soarnol ®3808 | 100 | 60 | 70 | 80 | 80 | — | — |
| Lotader ®4720 | — | 40 | 30 | 20 | — | 100 | — |
| Lotader ®4503 | — | — | — | — | 20 | — | 100 |

As illustrated in Table 2, different polymers are mixed in order to provide the coating layer samples 1 to 7. The coating layers are prepared by mixing the different polymers in a mixing bag prior to placing the mixture in the extruder. The polymer mixtures are then extruded using an extrusion system having a vertical single screw extruder. The extrusion process is carried out with a 25.4 cm wide extrusion die and with a 30.5 cm wide Matte or Glossy Finish primary cooling roll at a temperature of from 177° C. to 260° C.

The mixture is extruded as a coating layer onto one side of a support substrate, which comprised a tie layer, made of Lotader®3210, having a thickness of about 35 μm disposed on a scrim of woven HDPE having a thickness of about 77 μm in order to produce different printable recording media 1-7. The temperature during the extrusion is controlled at 230 to 280° C. The thickness of the extruded film of polymeric composition was controlled at about 20 to about 30 gsm.

Example 2—Printable Recording Media Performances

An identical image sequence is printed on the printable media samples 1 to 7, using a HP Designjet® L25500 (Hewlett Packard Inc.) with a 10 pass print mode. The printed image is cured at 90° C. The different recording media samples (1 to 7) are held for 24 hours and are then measured for different parameters and properties: image quality, scratch resistance and ink adhesion evaluations. Such performance results are expressed in the Tables 3.

The tests were done in condition where the environmental temperature was in the range of 22° C. to 27° C., and the relative humidity was in the range of 45% to 55%. Image quality assessment is conducted by visual ranking with a ranking score based on a scale of 1 to 5 with 1 being the best and 5 being the worst.

Image quality is evaluated by visually rating the bleed, coalescence, and color vibrancy of the printed materials. The tested samples are rated visually on a scale of 1 to 5 based on the following criteria: 1—No visible ink coalescence and color to color bleed in the printed sample and high color vibrancy; 2—Slight ink coalescence and color to color bleed in the printed sample and medium high color vibrancy; 3—Moderate ink coalescence and color to color bleed in the printed sample and moderate color vibrancy; 4—Poor ink coalescence and color to color bleed in the printed sample and poor color vibrancy; 5—Severe ink coalescence and color to color bleed in the printed sample and low color vibrancy.

The scratch resistance test is performed using a coin scratch method. A coin shaft (i.e. moving sharp weight of about 100 g) is applied to the testing sample with a constant pressure and the shaft is moved at a constant speed. The tested samples are rated visually on a scale of 1 to 5 based on the following criteria: 1—No visible change in the printed sample; 2—Visible gloss change in the printed sample; 3—Little ink removal in the printed sample; 4—Some ink removal in the printed sample; 5—Severe ink removal in the printed sample.

Ink adhesion tests are carried out by using a "tape peel" test in which a piece of adhesive tape (3M tape #610) is applied to the ink layer and left to sit for 1 minute. The tape is then removed. The amount of ink transferred to the tape is analyzed visually. The tested samples are rated visually on a scale of 1 to 5 based on the following criteria: 1—No visible change in the printed sample; 2—Slight ink removal in the printed sample; 3—Little ink removal in the printed sample; 4—Some ink removal in the printed sample; 5—Severe ink removal in the printed sample.

The results of the above tests are summarized in Table 3 below where, as mentioned above, the ranking is based on 1 to 5 scale where 1 is the best and 5 is the worst. A number of 3 or above is considered unacceptable.

According to these results, only the printable recording media according to the present disclosure (Examples 2-5) yield good results in all three tests, namely, image quality, scratch resistance and adhesion.

TABLE 3

| MEDIA samples with coating | | | | | | | |
|---|---|---|---|---|---|---|---|
| | Example 1 | Example 2 | Example 3 | Example 4 | Example 5 | Example 6 | Example 7 |
| adhesion test | 4 | 1 | 1 | 1 | 1 | 1 | 1 |
| scratching resistance | 1 | 1 | 1 | 1 | 1 | 4 | 4 |
| coalescence - image quality | 2 | 3 | 2 | 1 | 2 | 4 | 4 |

The invention claimed is:

1. A printable recording medium comprising:
   a) a substrate;
   b) and a coating layer including a mixture of:
      i) a first polymer comprising an ethylene-vinyl alcohol co-polymer with a crystallization temperature that is above 150° C.; and
      ii) a second polymer comprising:
         ethylene residues;
         ethyl acrylate residues or acrylic ester residues; and
         maleic anhydride residues;
      wherein the amount of first polymer in the mixture is about 50% to about 95% by weight.

2. A printable recording medium comprising:
   a) a substrate;
   b) and a coating layer including a mixture of:
      i) a first polymer selected from the group consisting of:
         a polymer comprising ethylene residues and vinyl alcohol residues; and
         a polymer comprising vinyl alcohol residues; and
      ii) a second polymer comprising a terpolymer of ethylene, ethyl acrylate, and maleic anhydride;
      wherein the amount of first polymer in the mixture is about 50% to about 95% by weight.

3. The printable recording medium of claim 1 wherein, in the coating layer, the second polymer is a terpolymer of ethylene, acrylic ester, and maleic anhydride.

4. The printable recording medium of claim 1 wherein, in the coating layer, the amount of the first polymer in the mixture is about 70% to about 95% by weight and the amount of the second polymer in the mixture is about 5% to about 30% by weight.

5. The printable recording medium of claim 1 wherein, in the coating layer, the amount of the first polymer in the mixture is about 80% to about 90% by weight and the amount of the second polymer in the mixture is about 10% to about 20% by weight.

6. The printable recording medium of claim 2 wherein, in the coating layer, the amount of the first polymer in the mixture is about 80% to about 90% by weight and the amount of the second polymer in the mixture is about 10% to about 20% by weight.

7. The printable recording medium of claim 1 wherein an amount of vinyl alcohol residues in the first polymer ethylene-vinyl alcohol co-polymer is about 50% to about 99% by weight.

8. The printable recording medium of claim 1 wherein the substrate is a composition comprising ingredients selected from the group consisting of polyolefins, polyesters, polyurethanes, polyvinyl chlorides, polyamides, polystyrene, ethylene vinyl alcohol, polylactic acid, cellulose, and combinations of two or more of the above.

9. The printable recording medium of claim 1 wherein the substrate is fabricated from one or both of low density polyethylene and high density polyethylene.

10. The printable recording medium of claim 1 wherein the substrate is a woven layer made of one or both of low density polyethylene and high density polyethylene.

11. The printable recording medium of claim 1 wherein the substrate further comprises a tie layer that is an extruded polymeric film or a co-extruded polymeric film.

12. A printable recording medium comprising:
    a) a substrate comprising a tie layer made of polymeric polymers that comprise butyl acrylate residues, maleic anhydride residues, and ethylene residues;
    b) and a coating layer including a mixture of:
       i) a first polymer selected from the group consisting of:
          a polymer comprising ethylene residues and vinyl alcohol residues; and
          a polymer comprising vinyl alcohol residues; and
       ii) a second polymer comprising:
          ethylene residues;
          ethyl acrylate residues or acrylic ester residues; and
          maleic anhydride residues;
       wherein the amount of first polymer in the mixture is about 50% to about 95% by weight.

13. An article comprising:
    a) a planar scrim having a first side and a second side;
    b) an extruded polymer film, on the first side and on the second side of the planar scrim; and
    c) an extruded ink-receiving material, applied on the extruded polymer film, on one or both of the first side and the second side of the planar scrim; the extruded ink-receiving material comprising a mixture of:
       a first polymer comprising an ethylene-vinyl alcohol co-polymer with a crystallization temperature that is above 150° C.; and
       a second polymer being a terpolymer of ethylene residues, ethyl acrylate residues, and maleic anhydride residues.

14. A method for making a printable recording material comprising:
    a) providing a substrate; and
    b) extruding a coating layer including a mixture of:
       a first polymer comprising an ethylene-vinyl alcohol co-polymer with a crystallization temperature that is above 150° C.; and
       a polymer comprising vinyl alcohol residues; and a second polymer comprising:
ethylene residues;
ethyl acrylate residues or acrylic ester residues; and
maleic anhydride residues;
wherein the amount of first polymer in the mixture is about 50% to about 95% by weight.

15. The method for making a printable recording material of claim 14 wherein a tie layer is extruded on one or both of the surface of the substrate before the extrusion of the coating layer.

16. The printable recording medium of claim 2 wherein the first polymer is an ethylene-vinyl alcohol co-polymer.

17. The printable recording medium of claim 2 wherein the first polymer is an ethylene-vinyl alcohol co-polymer with a crystallization temperature that is above 150° C.

18. A printable recording medium comprising:
a) a substrate;
b) and a coating layer including a mixture of:
   i) a first polymer selected from the group consisting of:
      a polymer comprising ethylene residues and vinyl alcohol residues; and
      a polymer comprising vinyl alcohol residues; and
   ii) a second polymer comprising:
      ethylene residues;
      ethyl acrylate residues or acrylic ester residues; and
      maleic anhydride residues;
wherein the amount of first polymer in the mixture is about 50% to about 95% by weight;
and wherein:
   the ethylene residues are present in the second polymer in a percentage by weight ranging from about 50% to about 90%;
   the ethyl acrylate residues or the acrylic ester residues are present in the second polymer in a percentage by weight ranging from about 10% to about 50%; and
   the maleic anhydride residues are present in the second polymer in a percentage by weight ranging from about 0.01% to about 10%.

19. The printable recording medium of claim 18 wherein:
the ethylene residues are present in the second polymer in a percentage by weight ranging from about 60% to about 80%;
the ethyl acrylate residues are present in the second polymer in a percentage by weight ranging from about 20% to about 30%; and
the maleic anhydride residues are present in the second polymer in a percentage by weight ranging from about 0.1% to about 3%.

20. The printable recording medium of claim 18 wherein:
the ethylene residues are present in the second polymer in a percentage by weight ranging from about 70% to about 80%;
the acrylic ester residues are present in the second polymer in a percentage by weight ranging from about 20% to about 30%; and
the maleic anhydride residues are present in the second polymer in a percentage by weight ranging from about 0.1% to about 3%.

21. The printable recording medium of claim 1 wherein:
the substrate comprises a tie layer disposed on a woven layer, the tie layer including a terpolymer of ethylene, acrylic ester, and maleic anhydride, and the woven layer including high density polyethylene;
the amount of first polymer in the mixture is about 80% by weight;
the amount of second polymer in the mixture is about 20% by weight;
the ethylene residues are present in the second polymer in a percentage by weight ranging from about 60% to about 80%;
the ethyl acrylate residues are present in the second polymer in a percentage by weight ranging from about 20% to about 30%; and
the maleic anhydride residues are present in the second polymer in a percentage by weight ranging from about 0.1% to about 3%.

* * * * *

UNITED STATES PATENT AND TRADEMARK OFFICE
CERTIFICATE OF CORRECTION

PATENT NO. : 10,166,804 B2  
APPLICATION NO. : 15/306993  
DATED : January 1, 2019  
INVENTOR(S) : Bor-Jiunn Niu et al.

Page 1 of 1

It is certified that error appears in the above-identified patent and that said Letters Patent is hereby corrected as shown below:

On the Title Page

Column 1, item (72), Inventors, Line 2, delete "Oheya M. Alfekri," and insert -- Dheya M. Alfekri, --, therefor.

Signed and Sealed this  
Second Day of April, 2019

Andrei Iancu  
*Director of the United States Patent and Trademark Office*